(No Model.)
F. C. WHITE.
HORSE COLLAR PAD.
No. 434,647. Patented Aug. 19, 1890.
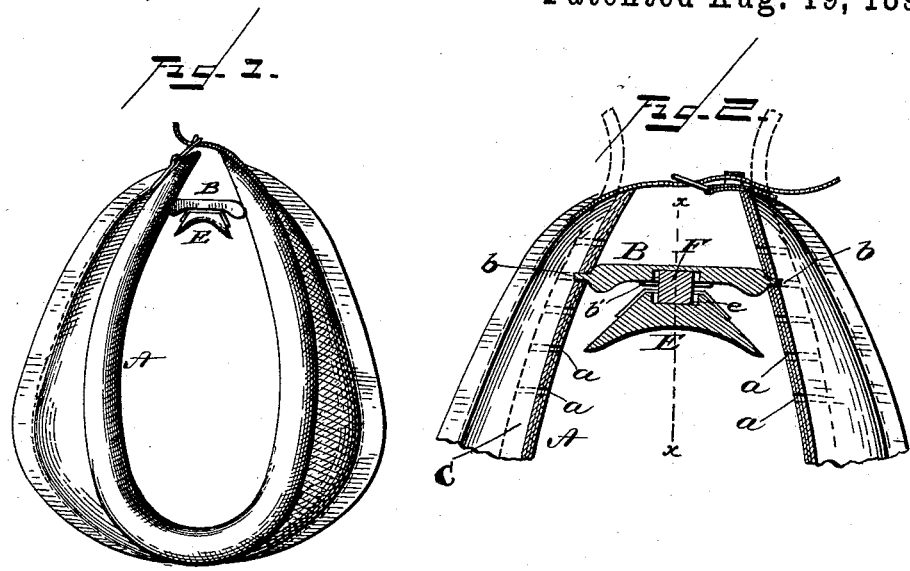
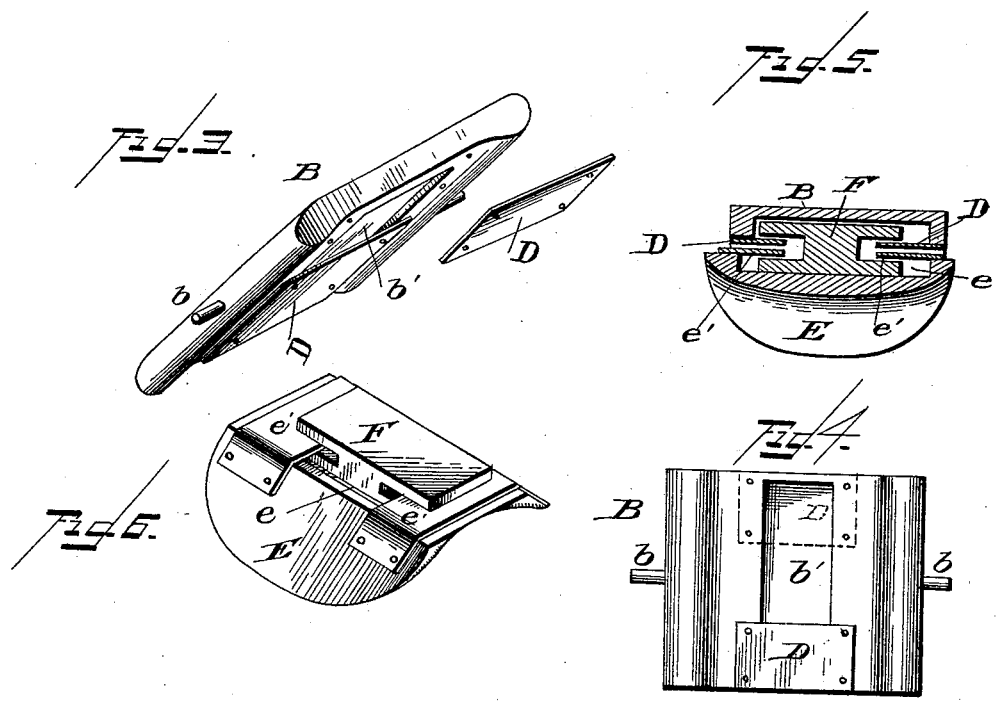
WITNESSES
F. L. Ourand
Geo. A. Wooster
INVENTOR
Francis C. White
By
Chas. E. Fairman, his Attorney

UNITED STATES PATENT OFFICE.

FRANCIS C. WHITE, OF PITTSVILLE, WISCONSIN.

HORSE-COLLAR PAD.

SPECIFICATION forming part of Letters Patent No. 434,647, dated August 19, 1890.

Application filed July 3, 1889. Renewed July 15, 1890. Serial No. 358,804. (No model.)

*To all whom it may concern:*

Be it known that I, FRANCIS C. WHITE, a citizen of the United States of America, residing at Pittsville, in the county of Wood and State of Wisconsin, have invented certain new and useful Improvements in Attachments and Pads for Horse-Collars, of which the following is a specification, reference being had therein to the accompanying drawings.

Figure 1 is a front elevation of a horse-collar with my improvements secured thereto. Fig. 2 is a vertical sectional view showing the hames in dotted lines. Fig. 3 is a detail view, in perspective, of the spreader and support, showing one of the metallic plates detached. Fig. 4 is an inverted plan view of the same. Fig. 5 is a cross-sectional view on the line $x\,x$, Fig. 2; and Fig. 6 is a detail view of the pad and pivotal connection.

Like letters of reference refer to like parts throughout the several views.

My invention has relation to an improved attachment and pad for horse-collars; and it has for its object to provide a device of such construction as to enable the collar to fit the neck and shoulders of the animal easily and comfortably, and at the same time afford a good and substantial support for the inside of the top of the collar, so that the hames may be buckled or fastened very tightly and securely to the collar in order to hold them in proper place upon the collar without at the same time pressing the same too close upon the back or shoulders of the horse, as is often the case where the collar has no other support at the top with the exception of the neck or shoulders, whereby, by reason of undue pressure, soreness and often lameness result; furthermore, in providing a construction whereby the hames are supported and held rigidly in their proper place upon the collar and prevented from slipping or being pulled down from their proper position by the weight carried by the hames or by the draft of the team pulling or backing loads or otherwise; and with these and other objects in view my invention consists in the improved construction and combination of parts, as hereinafter more fully set forth and described.

Referring to the drawings forming part of this specification, the letter A represents a horse-collar of the ordinary construction, the groove or recess thereof being provided with a series of perforations or holes $a$. It is of course obvious that the connecting element may be secured to or be formed integral with either the upper or lower section of the pad and practically effect the function assigned— as, for instance, if secured rigidly to the upper section any motion imparted to the latter will not be communicated to the lower section by reason of the lower end of the connecting element moving loosely within the groove of the lower section; and, vice versa, if the attachment is reversed any motion imparted to the lower section by the movement of the animal will not be communicated to the upper section.

The letter B represents the upper collar-support provided with laterally-extending arms or projections $b\,b$, designed to be passed through the apertures in the groove of the collar into similar registering perforations in the hames C.

In collars of the ordinary construction several disadvantages are quite prevalent. For instance, in adjusting a collar to the neck of an animal it will often be found that the same is entirely too tight, causing much discomfort, and also when the hames are applied if they are drawn taut, so as to be securely held in place, there will, of necessity, be a consequent tightening of the collar. By the employment of the construction shown and described by me, however, these disadvantages are overcome, inasmuch as the upper support will have a tendency to spread the collar, and as the same is adjustable—that is to say, can be inserted in any of the series of apertures— this spreading apart of the collar can be conveniently regulated, as the higher up the support is adjusted the greater the spreading will be. By this means the collar may be made of such dimensions as to fit the necks of different animals, and as the support at the same time has the effect of making the collar more rigid at the top it is therefore also capable of withstanding the pressure of the hames when the same are drawn tightly against the collar without at the same time pressing the collar in too close contact with the neck. The collar-support is preferably rounded or concaved upon its under side and provided with a transverse recess or cavity $b'$, crossed at opposite ends at right angles by metallic plates D D, riveted or otherwise suitably secured so that they may be readily removed should it be necessary to disconnect the several parts.

Disposed beneath the collar-support is a pad E, said pad having its upper portion adapted to fit below the concaved under portion of the support, but not in contact therewith. This upper surface is provided with a recess or cavity e, running parallel with the recess in the support, and is likewise provided with metallic end strips e' e' at right angles to said recess. These two elements or parts of my device are pivotally connected by means of an H-shaped block or connection F, the lateral extensions of the upper and lower portions thereof fitting, respectively, in the recesses or cavities in the collar support and pad. By thus connecting these two parts it will be seen that they are prevented from coming in direct contact with each other by the peculiar construction of the connection, and if at the same time motion is to the slightest degree imparted to said connection it will not articulate with the pad, as the lower lateral extensions thereof are free to move within its recess or cavity. At the same time very little friction is encountered, as the two parts do not run in close enough juxtaposition to bear against each other, thereby presenting but little frictional surface. Furthermore, this pivotal connection holds the two parts together and keeps them in proper place, making a loose pivotal joint, allowing the lower part to remain stationary on the neck of the horse, while the upper part being connected with the collar receives the motion thereof without transferring it to the pad, which, it will be readily seen, produces the desired result in a most perfect manner.

The advantages of my improvement are obvious. In the first place I prevent friction upon the neck of the animal by means of the movable pivot connecting the rigid support with the pad hereinbefore described, and, secondly, I provide a construction whereby the strain is transferred from the collar to the hames, and at the same time the latter are held rigidly in their proper place upon the collar by constructing the upper collar support or spreader with the lateral extensions, which pass through the perforations in the grooves of the collar and then into registering perforations in the hames. By regulating the depth of the perforations in the hames I can allow the extensions to bear against the ends of the same, so that the pressure will be on the hames; or I can increase the depth of the perforations so that the inner side of the collar will receive the pressure; or, further, I can pass the extensions entirely through the perforations in the hames and have the ends thereof screw-threaded and secured by means of nuts or keys bearing against the outer side of the hames.

I prefer to construct the several parts of my device of metal, either cast or wrought, and the pivotal connection is preferably formed of one piece, although, of course, if desired, the central connecting-piece may be made separate.

My pad, it will be found, can be used advantageously in connection with other portions of the harness—for instance, as a back-pad for saddles and the like—without the necessity of changing the construction thereof to any considerable extent.

My invention is, furthermore, exceedingly simple in construction, inexpensive of production, and can be applied to any horse-collar without the necessity of altering the construction thereof.

Having thus described my invention, I claim and desire to secure by Letters Patent of the United States—

1. The combination, with hames provided with a series of perforations, of a horse-collar having the groove thereof provided with a series of transverse perforations registering with the transverse perforations in the hames, and of a support and spreader provided with laterally-extending arms, said arms provided with lugs fitting in the perforations, substantially as set forth.

2. In a pad for horse-collars, the combination, with upper and lower sections, of an intermediate block having tongues connecting said sections, said tongues being smaller than the bearings therefor in the sections, whereby said sections have free movement on the block independently of each other, substantially as set forth.

3. A pad for harness and the like, consisting of the upper section provided with a transverse recess or cavity, the strips arranged transversely over opposite ends of said recess or cavity, the lower section or pad having concaved under portion and provided with a recess or cavity upon its upper surface, strips arranged transversely over opposite ends of said recess, and the movable pivotal connection having the opposite bifurcated ends, substantially as set forth.

4. The combination of the hames provided with a series of perforations, the horse-collar having the groove thereof provided with perforations registering with the perforations in the hames, the support and spreader having laterally-extending arms and concaved and recessed under side, strips arranged transversely over opposite ends of said recess, the lower section or pad having concaved under portion and provided with a recess or cavity upon its upper surface, strips arranged transversely over opposite ends of said recess, and the movable pivotal connection having opposite bifurcated ends, substantially as set forth.

In testimony whereof I affix my signature in presence of two witnesses.

FRANCIS C. WHITE.

Witnesses:
F. S. WOODWORTH,
J. C. NOWATNEY.